(12) United States Patent
Sakurai et al.

(10) Patent No.: US 11,854,204 B2
(45) Date of Patent: Dec. 26, 2023

(54) INFORMATION PROCESSING DEVICE, INFORMATION PROCESSING METHOD, AND COMPUTER PROGRAM PRODUCT

(71) Applicant: KABUSHIKI KAISHA TOSHIBA, Tokyo (JP)

(72) Inventors: Shunsuke Sakurai, Kawasaki (JP); Ryo Nakashima, Kawasaki (JP); Akihito Seki, Yokohama (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 252 days.

(21) Appl. No.: 17/186,230

(22) Filed: Feb. 26, 2021

(65) Prior Publication Data

US 2022/0004816 A1    Jan. 6, 2022

(30) Foreign Application Priority Data

Jul. 6, 2020    (JP) .................................. 2020-116609

(51) Int. Cl.
*G06T 7/00* (2017.01)
*G06T 7/11* (2017.01)
(Continued)

(52) U.S. Cl.
CPC ............ *G06T 7/11* (2017.01); *G06F 18/2155* (2023.01); *G06N 3/08* (2013.01); *G06T 7/13* (2017.01);
(Continued)

(58) Field of Classification Search
CPC ...... G06K 9/6259; G06N 3/08; G06N 3/0454; G06T 7/11; G06T 7/13;
(Continued)

(56) References Cited

U.S. PATENT DOCUMENTS

2019/0180136 A1   6/2019   Bousmalis et al.
2019/0244107 A1*  8/2019   Murez .................... G06N 3/084
(Continued)

FOREIGN PATENT DOCUMENTS

JP    2019-523504 A    8/2019
JP    2019-207491 A    12/2019

OTHER PUBLICATIONS

Li et al., Weaklier Supervised Semantic Segmentation With Only One Image Level Annotation per Category, IEEE Transactions on Image Processing, Jan. 1, vol. 29, pp. 128-141. (Year: 2020).*

(Continued)

*Primary Examiner* — Ping Y Hsieh
*Assistant Examiner* — Xiao Liu
(74) *Attorney, Agent, or Firm* — Oblon, McClelland, Maier & Neustadt, L.L.P.

(57) ABSTRACT

According to an embodiment, an information processing device include: one or more processors. The processors input data based on input data including first input data belonging to a first domain and second input data belonging to a second domain different from the first domain, to a first model, and acquire first output data indicating an execution result of a first task with the first model. The processors input data based on the input data to a second model, and acquire second output data indicating an execution result of a second task with the second model. The processors convert the first output data into first conversion data expressed in a form of an execution result of the second task. The processors generate supervised data of the second model for the first input data, based on the first conversion data and the second output data.

15 Claims, 11 Drawing Sheets

(51) Int. Cl.
*G06N 3/08* (2023.01)
*G06T 7/13* (2017.01)
*G06F 18/214* (2023.01)
*G06V 10/774* (2022.01)
*G06V 10/82* (2022.01)

(52) U.S. Cl.
CPC .......... *G06V 10/7753* (2022.01); *G06V 10/82* (2022.01)

(58) Field of Classification Search
CPC ........ G06T 2207/20081; G06V 10/451; G06V 10/7753; G06V 10/82
See application file for complete search history.

(56) References Cited

U.S. PATENT DOCUMENTS

2020/0134446 A1* 4/2020 Soni .......................... G06N 3/08
2020/0286383 A1* 9/2020 Tran ..................... G06V 10/454

OTHER PUBLICATIONS

Laina et al. "Deeper Depth Prediction with Fully Convolutional Residual Networks", IEEE International conference on 3D Vision (3DV) 2016, 12 pages.

* cited by examiner

INFORMATION PROCESSING DEVICE, INFORMATION PROCESSING METHOD, AND COMPUTER PROGRAM PRODUCT

CROSS-REFERENCE TO RELATED APPLICATIONS

This application is based upon and claims the benefit of priority from Japanese Patent Application No. 2020-116609, filed on Jul. 6, 2020; the entire contents of which are incorporated herein by reference.

FIELD

Embodiments described herein relate generally to an information processing device, an information processing method, and a computer program product.

BACKGROUND

There are multitask execution devices having a function of outputting execution results of two or more different tasks. For example, such multitask execution devices include a multitask execution device simultaneously outputting results of depth estimation and results of semantic segmentation (region segmentation).

DETAILED DESCRIPTION

Figure 1:
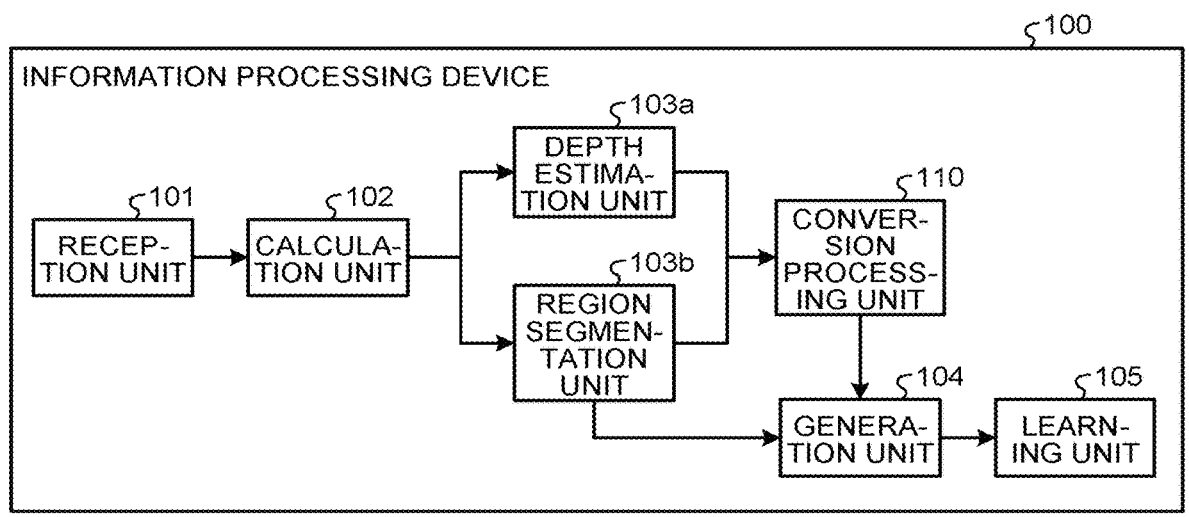
FIG. 1 is a block diagram of an information processing device according to a first embodiment.

According to an embodiment, an information processing device include: one or more processors. The processors input data based on input data including first input data belonging to a first domain and second input data belonging to a second domain different from the first domain, to a first model, and acquire first output data indicating an execution result of a first task with the first model. The processors input data based on the input data to a second model, and acquire second output data indicating an execution result of a second task with the second model. The processors convert the first output data into first conversion data expressed in a form of an execution result of the second task. The processors generate supervised data of the second model for the first input data, based on the first conversion data and the second output data.

Preferred embodiments of an information processing device according to the present invention will now be described in detail with reference to the attached drawings.

First Embodiment

An information processing device according to the first embodiment generates pseudo supervised data of a domain in which no supervised data exists using the fact that a difference between domains in an input space partly decreases in an output space, to use the pseudo supervised data for learning. The input space is a space that input data of a task can take. The output space is a space that output data of a task can take. The information processing device according to the present embodiment performs conversion between tasks on the basis of execution results (estimation results) of each of the tasks, generates pseudo supervised data from the converted execution results, and updates parameters of a model (such as a neural network) used for the task. This structure enables learning of the model of the task even in a domain in which no supervised data exists. Consequently, this structure improves accuracy of estimation of the task.

The first embodiment illustrates an example of the information processing device being a multitask execution device executing two tasks, that is, depth estimation and region segmentation (semantic segmentation). Depth estimation is a task of estimating a depth estimation image from an input image.

The depth estimation image is an image for which a distance in the real world between a camera (imaging device) imaging an input image and an object displayed in each pixel is set as a pixel value of the pixel. The pixel value of the depth estimation image is not limited to an actual distance, but may be a reciprocal of the distance as a parallax.

Region segmentation is a task of estimating a region segmentation image from the input image. The region segmentation image is an image including, as a pixel value of each of the pixels, a probability of belonging to a class of a plurality of classes each indicating a type of an object.

The following explanation mainly illustrates an example of generating pseudo supervised data used for learning of the model of region segmentation using a region segmentation image acquired by converting a depth estimation image. Conversely, the same process is also applicable to the case of generating pseudo supervised data used for learning of the model of depth estimation using a depth estimation image acquired by converting the region segmentation image. As another example, the structure may be made such that both of them are executed to generate both pseudo supervised data used for learning of the model of region segmentation and pseudo supervised data used for learning of the model of depth estimation.

The tasks are not limited thereto, but may be a combination of any tasks. For example, the task may be any of depth estimation, semantic segmentation (region segmentation), instance segmentation, panoptic segmentation, object detection, autoencoder, super resolution, edge detection, generation of a saliency map, and normal line estimation.

The following explanation also illustrates an example in which each of the tasks is executed using a corresponding neural network. The model to execute the task is not limited to a neural network, but another machine learning model may be used.

FIG. 1 is a block diagram illustrating an example of a configuration of an information processing device 100 according to a first embodiment. As illustrated in FIG. 1, the information processing device 100 includes a reception unit 101, a calculation unit 102, a depth estimation unit 103a (an example of the first task execution unit), a region segmentation unit 103b (an example of the second task execution unit), a conversion processing unit 110, a generation unit 104, and a learning unit 105.

The reception unit 101 receives input of various types of data used in the information processing device 100. A method for receiving data with the reception unit 101 may be any method. For example, applicable methods include a method of receiving data via a network, such as the Internet, and a method of reading data from a storage medium storing data therein.

For example, the reception unit 101 receives input data including input data (an example of first input data) belonging to a domain A (an example of the first domain) and input data (an example of second input data) belonging to a domain B (an example of the second domain) different from the domain A. The input data belonging to the domain A includes, for example, supervised data of a neural network (an example of the first model) used for depth estimation, but may include or may not include supervised data of a neural network (an example of the second model) used for region segmentation.

The domain indicates, for example, a set of characteristics as follows, in the case of an image.
 Conditions in imaging, such as lightness, season, and area
 Texture and color of object existing in the image
 Whether the image is an image imaged with a camera or an image generated by computer graphics (CG)

The fact that a plurality of images belong to different domains means that at least one characteristic that is not common to the images exists among the characteristics described above.

In depth estimation and region segmentation, images are received as input data. In the following explanation, image input data is referred to as "input image". Among the input images received with the reception unit 101, an image belonging to the domain A is referred to as "input image 111a", and an image belonging to the domain B is referred to as "input image 111b". The input image 111a includes supervised data 112a serving as a true value corresponding to depth estimation, and the input image 111b includes supervised data 112b serving as a true value corresponding to region segmentation. These pieces of supervised data are used at the time of learning of the model of the corresponding task.

The reception unit 101 may perform data processing to make the data suitable for learning or estimation. The data processing to make the data suitable is processing, such as reduction, rotation, inversion, and color tone change of the image. To increase diversity of images used for learning, the reception unit 101 may perform data processing to generate a pseudo input image from the received input image. For example, the reception unit 101 performs processing to inverting the received input image in the right-and-left direction and changing the value of each channel of each of the pixels on a scale generated with a pseudo random number or the like to generate a new input image.

Because the input data is not required to be an image, processing other than the processing described above may be used as data processing in accordance with the form of the input data. The input images processed with the reception unit 101 are input to the calculation unit 102 to calculate features in the image.

The calculation unit 102 calculates a feature image (an example of feature data) indicating the feature of the input image (an example of the input data). For example, the calculation unit 102 calculates a feature image indicating a region serving as a feature useful for performing region segmentation or depth estimation for the image processed with the reception unit 101. The method for calculating the feature image may be any method. For example, a method of using a machine learning model, such as a convolutional neural network, may be used.

For example, the calculation unit 102 repeats an arithmetic operation using a convolutional neural network in a plurality of layers for the image processed with the reception unit 101 to calculate a feature image 121. In the following explanation, a feature image calculated for the input image 111a is referred to as "feature image 121a", and a feature image calculated for the input image 111b is referred to as "feature image 121b".

The feature images 121 (121a and 121b) are input to the depth estimation unit 103a and the region segmentation unit 103b. The same feature image 121 may be input to the depth estimation unit 103a and the region segmentation unit 103b, or different feature images 121 may be input to them.

For example, a method may be used to divide the last layer of the convolutional neural network into a layer to calculate a feature image to be input to the depth estimation unit 103a and a layer to calculate a feature image to be input to the region segmentation unit 103b. As another example, a method may be used to input the output intermediate layer of the convolutional neural network as a feature image to one or both of the depth estimation unit 103a and the region segmentation unit 103b.

The model of each of the tasks may be configured to receive the input image, instead of the feature image. In this case, some or all of the functions of the calculation unit 102 may be omitted.

The depth estimation unit 103a inputs data based on the input image to the model of depth estimation, and acquires output data (an example of first output data) indicating execution results of depth estimation based on the model. The data based on the input image is the feature image 121 or the input image itself. The model of depth estimation may be any model, such as a convolutional neural network including a plurality of receptive fields of different sizes.

The following explanation illustrates an example in which the feature image 121 serves as an input for the model. In this case, the depth estimation unit 103a estimates a depth estimation image 131 on the basis of the feature image 121 (121a, 121b) calculated with the calculation unit 102, and outputs the depth estimation image 131 as output data. In the following explanation, a depth estimation image generated for the feature image 121a is referred to as "depth estimation image 131a", and a depth estimation image generated for the feature image 121b is referred to as "depth estimation image 131b".

The convolutional neural network used in the depth estimation unit 103a is learned by minimizing a regression loss function indicating a difference between the depth estimation image 131a and the supervised data 112a by a gradient method. A loss function, such as BerHu loss $L^{BerHu}$ expressed by the following Expression (1), can be used as the regression loss function.

$$L^{berhu}(d, d^{gt}) = \begin{cases} |d - d^{gt}|, \text{ if } |d - d^{gt}| < \delta \\ \dfrac{(d - d^{gt})^2 + \delta^2}{2\delta}, \text{ otherwise} \end{cases} \quad (1)$$

BerHu loss is a loss function with which loss L1 and loss L2 are switched with a threshold δ. Specifically, BerHu loss has the character of gently approaching 0 as the loss L1 in a region in which the absolute value of a difference between the estimation value d and the true value dgt in each of the pixels is smaller than the threshold δ and close to 0, and more rapidly approaching 0 like the loss L2 in a region in which the absolute value of the difference is larger than the threshold δ and largely distant from 0. Minimizing the BerHu loss enables homogenous learning of the region with a large distance in which an error tends to increase and a region with a small error. The threshold δ can be adaptively determined. For example, a value 0.2 times as large as the value of the pixel having the largest loss in the image may be set as the threshold δ.

The region segmentation unit 103b inputs data based on the input image to the model of region segmentation, and acquires output data (an example of second output data) indicating execution results of region segmentation based on the model. The model of region segmentation may be any model. For example, the model is a convolutional neural network including a plurality of receptive fields of different sizes.

When the feature image 121 serves as input of the model, the region segmentation unit 103b estimates a region segmentation image 141 on the basis of the feature image 121 (121a, 121b) calculated with the calculation unit 102, and outputs the region segmentation image 141 as output data. In the following explanation, a region segmentation image generated for the feature image 121a is referred to as "region segmentation image 141a", and a region segmentation image generated for the feature image 121b is referred to as "region segmentation image 141b".

The convolutional neural network used in the region segmentation unit 103b is learned by minimizing a classification loss function 142 indicating a difference between the region segmentation image 141b and the supervised data 112b by a gradient method. A loss function, such as cross entropy loss $L^{ce}$ expressed by the following Expression (2), can be used as the classification loss function.

$$L^{ce} = -\sum_x p(x) \log q(x) \quad (2)$$

The cross entropy loss is a loss acquired by calculating the product of the estimation probability p(x) for the class of label x and a logarithm of the true value q(x). The true value q(x) is a function having a value of 1 when label x agrees with the correct label, and having a value of 0 in the other cases.

Figure 2:
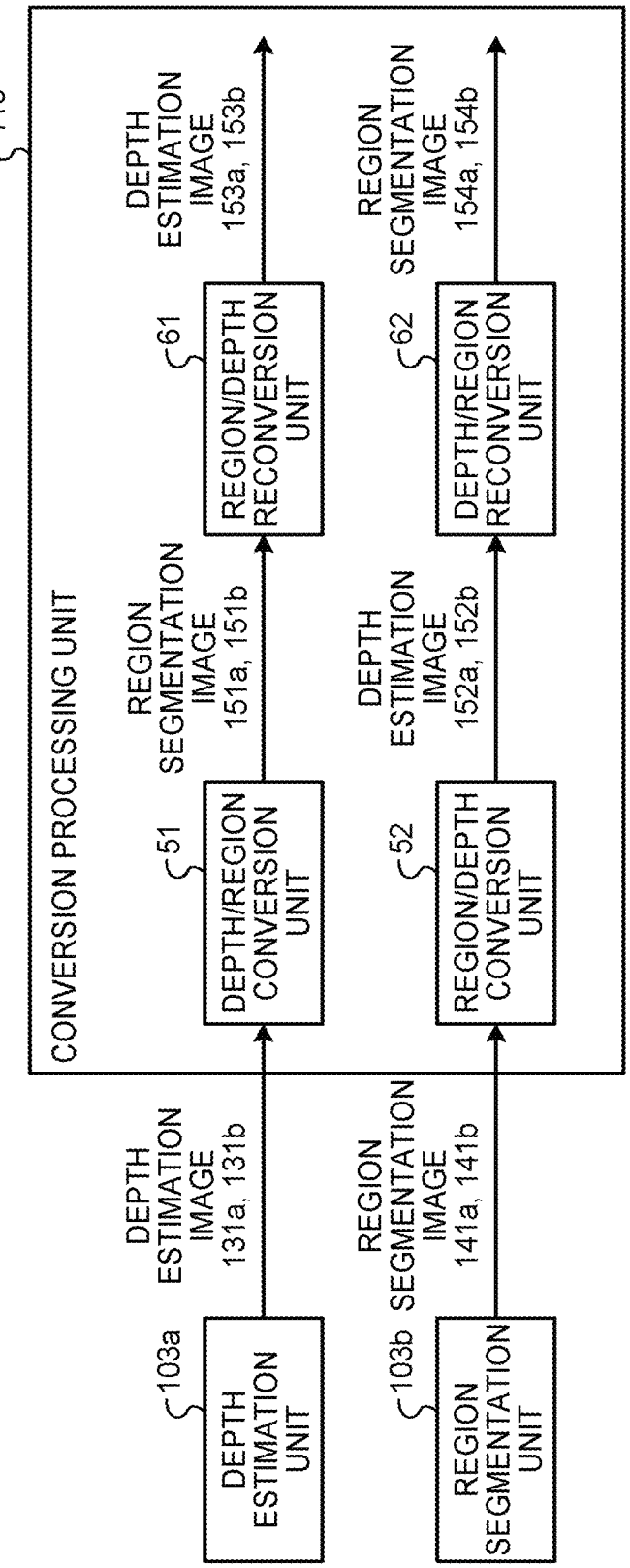
FIG. 2 is a functional block diagram of a conversion processing unit.

The conversion processing unit 110 converts the depth estimation image generated with the depth estimation unit 103a, and outputs a region segmentation image indicated in the form of execution results of region segmentation. The following is an explanation of details of the function of the conversion processing unit 110 with reference to FIG. 2 and FIG. 3. FIG. 2 is a block diagram illustrating an example of detailed functions of the conversion processing unit 110.

Figure 3:
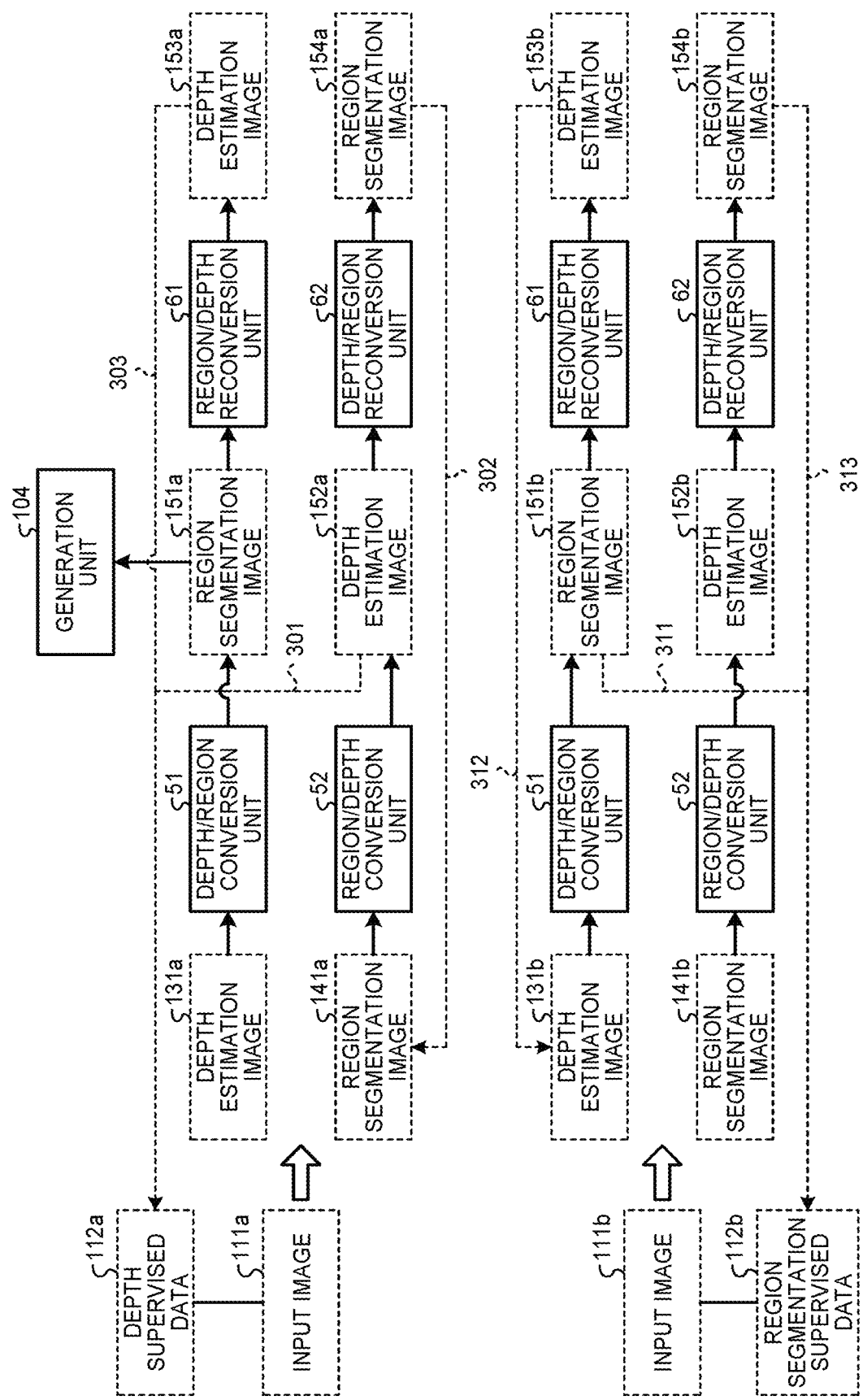
FIG. 3 is a diagram illustrating an operation example of the conversion processing unit.

FIG. 3 is a diagram illustrating an operation example of the conversion processing unit 110.

As illustrated in FIG. 2, the conversion processing unit 110 includes a depth/region conversion unit 51, a region/depth conversion unit 52, a region/depth reconversion unit 61, and a depth/region reconversion unit 62.

The depth/region conversion unit 51 (an example of the first conversion unit) converts the depth estimation images 131a and 131b into region segmentation images 151a and 151b (an example of first conversion data), respectively.

The region/depth conversion unit 52 (an example of the second conversion unit) converts the region segmentation images 141a and 141b into depth estimation images 152a and 152b (an example of second conversion data), respectively.

The region/depth reconversion unit 61 (an example of the first reconversion unit) performs reconversion to restore the region segmentation images 151a and 151b to depth estimation images 153a and 153b (an example of first reconversion data), respectively.

The depth/region reconversion unit 62 (an example of the second reconversion unit) performs reconversion to restore the depth estimation images 152a and 152b to region segmentation images 154a and 154b (an example of second reconversion data), respectively.

Each of the depth/region conversion unit 51, the region/depth conversion unit 52, the region/depth reconversion unit 61, and the depth/region reconversion unit 62 is formed of, for example, a convolutional neural network to have functions equivalent to those of a neural network acquired by combining the calculation unit 102 and the depth estimation unit 103a or the region segmentation unit 103b.

The model (an example of the first conversion model) used with the depth/region conversion unit 51 and the model (an example of the first reconversion model) used with the depth/region reconversion unit 62 have the same neural network configuration, and share parameters of the convolutional neural network. The depth/region conversion unit 51 and the depth/region reconversion unit 62 may be integrated into a convolutional neural network.

The model (an example of the second conversion model) used with the region/depth conversion unit 52 and the model (an example of the second reconversion model) used with the region/depth reconversion unit 61 have the same neural network configuration, and share parameters of the convolutional neural network. The region/depth conversion unit 52 and the region/depth reconversion unit 61 may be integrated into a convolutional neural network.

In the conversion processing unit 110, first, the depth/region conversion unit 51 generates a region segmentation image 151a on the basis of the depth estimation image 131a calculated with the depth estimation unit 103a, or generates a region segmentation image 151b on the basis of the depth estimation image 131b. In the same manner, the region/depth conversion unit 52 generates a depth estimation image 152a on the basis of the region segmentation image 141a calculated with the region segmentation unit 103b, or generates a depth estimation image 152b on the basis of the region segmentation image 141b.

The region segmentation images 151a and 151b are input to the region/depth reconversion unit 61. The region/depth reconversion unit 61 generates a depth estimation image 153a from the region segmentation image 151a, and generates a depth estimation image 153b from the region segmentation image 151b.

The depth estimation images 152a and 152b are input to the depth/region reconversion unit 62. The depth/region reconversion unit 62 generates a region segmentation image 154a from the depth estimation image 152a, and generates a region segmentation image 154b from the depth estimation image 152b.

The purpose of repeating conversion and reconversion as described above is to prevent the depth/region conversion unit 51 from excessively learning influence in the output space caused by a difference in domains in the input space. For example, to learn the depth/region conversion unit 51, it is considered to minimize a classification error (classification loss function) indicating a difference between the region segmentation image 151b and the corresponding supervised data 112b. However, because supervised data of region segmentation for the region segmentation image 151a is lacking, learning to minimize a difference from the supervised data cannot be executed. For this reason, a neural network used with the depth/region conversion unit 51 is learned as a neural network converting the depth estimation image 131b to the region segmentation image 151b.

For such learning, the region/depth conversion unit 52 generates a depth estimation image 152a on the basis of the region segmentation image 141a. The neural network used with the region/depth conversion unit 52 is learned by minimizing the regression loss function indicating a difference between the depth estimation image 152a and the corresponding supervised data 112a of depth estimation (arrow 301 in FIG. 3). A regression loss function indicating a difference between the depth estimation image 153a and the corresponding supervised data 112a of depth estimation may be further added as the loss function in learning (arrow 303 in FIG. 3).

The depth estimation image 152a is input to the depth/region reconversion unit 62. The depth/region reconversion unit 62 generates a region segmentation image 154a on the basis of the depth estimation image 152a. The neural network used with the depth/region reconversion unit 62 is learned such that the region segmentation image 154a agrees with the region segmentation image 141a, that is, the reconversion result is restored to the image before conversion (arrow 302 in FIG. 3). For example, the neural network used with the depth/region reconversion unit 62 is learned by minimizing the classification loss function indicating a difference between the region segmentation image 154a and the region segmentation image 141a.

The depth/region conversion unit 51 and the depth/region reconversion unit 62 share parameters of the neural network. For this reason, learning of the depth/region reconversion unit 62 enables learning of the depth/region conversion unit 51, even with the estimation results (region segmentation image 151a) of region segmentation based on the input image 111a lacking supervised data of region segmentation.

The region/depth conversion unit 52 also has the same problem as the depth/region conversion unit 51 does. For this reason, first, the region/depth reconversion unit 61 converts the region segmentation image 151b into the depth estimation image 153b. The neural network used with the region/depth reconversion unit 61 is learned by minimizing the regression loss function indicating a difference between the depth estimation image 153b and the depth estimation image 131b (arrow 312 in FIG. 3). This structure enables learning of the region/depth conversion unit 52, even with the results (depth estimation image 131b) of depth estimation based on the input image 111b lacking supervised data of depth estimation.

The regression loss function (arrow 311 in FIG. 3) indicating a difference between the region segmentation image 151b and the corresponding region segmentation supervised data 112b and the regression loss function indicating a difference between the region segmentation image 154b and the corresponding region segmentation supervised data 112b may be further added as the loss function in learning (arrow 313 in FIG. 3).

BerHu loss or the like may be used as the regression loss function for the depth estimation image. Cross entropy loss or the like may be used as the classification loss function for the region segmentation image.

The conversion processing unit 110 outputs the region segmentation image 151a to the generation unit 104.

With reference to FIG. 1 again, the generation unit 104 generates pseudo supervised data of region segmentation corresponding to the input image 111a, on the basis of the region segmentation image 151a output from the conversion processing unit 110 and the region segmentation image 141a output from the region segmentation unit 103b.

Generation of pseudo supervised data enables execution of learning of the calculation unit 102 and the region segmentation unit 103b even for the domain to which the input image 111a belongs. By contrast, when a region for which estimation with the task is erroneous is dealt with as pseudo supervised data, the model is learned with the erroneous supervised data, and the estimation accuracy of the model may deteriorate.

For this reason, to avoid damage to reliability of the pseudo supervised data, the generation unit 104 determines the pixel (pseudo supervised pixel) included in the pseudo supervised data on the basis of one or more rules to secure degrees of reliability. For example, the following rules are applied.

R1: One or more pixels with degrees of reliability higher than those of another pixel (an example of an element) are set as the pseudo supervised pixels in both the region segmentation image 141a and the region segmentation image 151a. The degree of reliability is, for example, the classification probability of each class. Whether the degree of reliability is higher than that of another pixel is determined on the basis of, for example, whether the degree of reliability of the pixel is larger than a threshold.

R2: When the pixels positioned at the same coordinates in the region segmentation image 141a and the region segmentation image 151a are classified into the same class, the pixels are set as pseudo supervised pixels.

The generation unit 104 sets, as the pseudo supervised data, the pseudo supervised pixels determined in accordance with the rules described above, for example, in the region segmentation image 151a, and deals the pixels other than the pseudo supervised pixels as an unclassifiable class.

The models used with the calculation unit 102 and the region segmentation unit 103b can be learned for not only the input image 111b but also the domain to which the input image 111a belongs, by minimizing the classification loss function (such as cross entropy loss) indicating a difference between the region segmentation image 141a and the generated pseudo supervised data.

The learning unit 105 learns the models used with the units described above. For example, the learning unit 105 learns some or all of the model used with the calculation unit 102 for calculation of the feature image, the model used with the depth estimation unit 103a for depth estimation, the model used with the region segmentation unit 103b for region segmentation, and the model used with the conversion processing unit 110 for data conversion.

The learning unit 105 may learn a model acquired by integrating some or all of these models, or may learn each of the models independently. The learning unit 105 executes learning to minimize the loss function set for each of the models as described above.

The learning unit 105 may learn a plurality of models in the order according to predetermined rules. For example, the learning unit 105 may learn the model used with the depth estimation unit 103a and the model used with the region segmentation unit 103b first, and learn the model of the conversion processing unit 110 after learning of the models is stabilized. The learning unit 105 may be configured to alternately execute learning of the model used with the depth estimation unit 103a and the model used with the region segmentation unit 103b, and learning of the conversion processing unit 110.

The learning unit 105 may execute learning with any algorithm. For example, in the case of applying a neural network as the model, the learning unit 105 can execute learning using a gradient method or the like.

Each of the units described above (the reception unit 101, the calculation unit 102, the depth estimation unit 103a, the region segmentation unit 103b, the conversion processing unit 110, the generation unit 104, and the learning unit 105) is implemented with, for example, one or more processors. For example, each of the units described above may be implemented by causing a processor, such as a central processing unit (CPU), to execute a computer program, that is, software. Each of the units described above may be implemented with a processor, such as a dedicated integrated circuit (IC), that is, hardware. Each of the units described above may be implemented with software and hardware together. In the case of using a plurality of processors, each processor may implement one of the units, or two or more of the units.

Parameters of each of the models may be stored in, for example, a storage unit (not illustrated) included in the information processing device 100. The storage unit may be formed of any generally used storage medium, such as a flash memory, a memory card, a random-access memory (RAM), a hard disk drive (HDD), and an optical disc.

Figure 4:
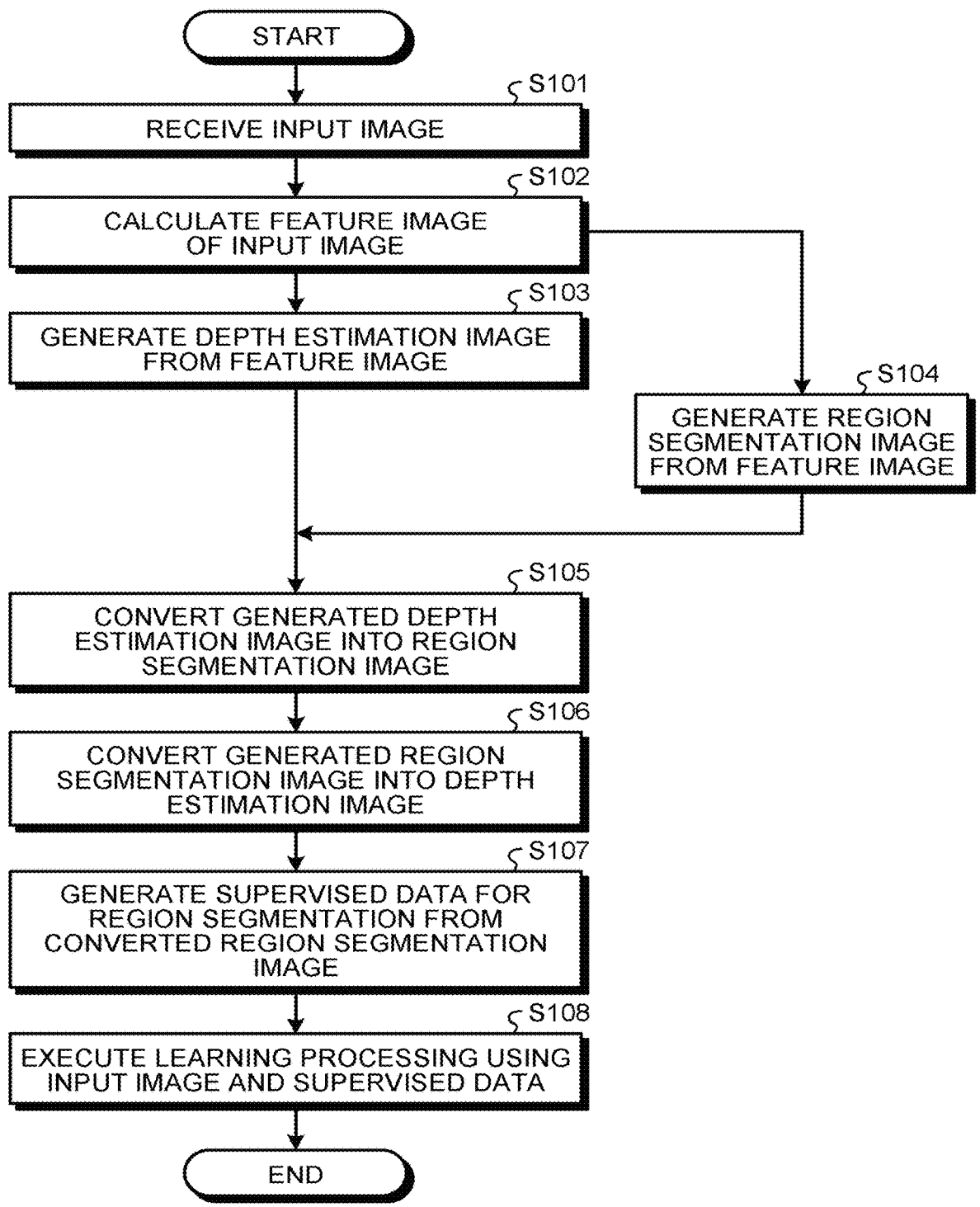
FIG. 4 is a flowchart illustrating learning processing in the first embodiment.

The following is an explanation of learning processing executed with the information processing device 100 according to the first embodiment structured as described above. FIG. 4 is a flowchart illustrating an example of learning processing according to the first embodiment.

The reception unit 101 receives input of an input image (Step S101). The input image may be the input image 111a belonging to the domain A, or the input image 111b belonging to the domain B. The reception unit 101 may execute data processing for the received input image, as described above.

The calculation unit 102 calculates a feature image from the input image transmitted from the reception unit 101 (Step S102).

The depth estimation unit 103a inputs the calculated feature image to a neural network, and estimates a depth estimation image (Step S103). In addition, the region segmentation unit 103b inputs the calculated feature image to a corresponding neural network, and estimates a region segmentation image (Step S104).

The depth/region conversion unit 51 in the conversion processing unit 110 converts the depth estimation image generated at Step S103 into a region segmentation image (Step S105). The region/depth conversion unit 52 in the conversion processing unit 110 converts the region segmentation image generated at Step S104 into a depth estimation image (Step S106). In addition, the region/depth reconversion unit 61 reconverts the region segmentation image into a depth estimation image, and the depth/region reconversion unit 62 reconverts the depth estimation image into a region segmentation image, for learning of each of the units in the conversion processing unit 110.

The generation unit 104 generates pseudo supervised data for the model of region segmentation from the region segmentation image converted at Step S105 (Step S107). The learning unit 105 executes learning using the input image, the supervised data for the input image, and the generated pseudo supervised data (Step S108).

Figure 5:
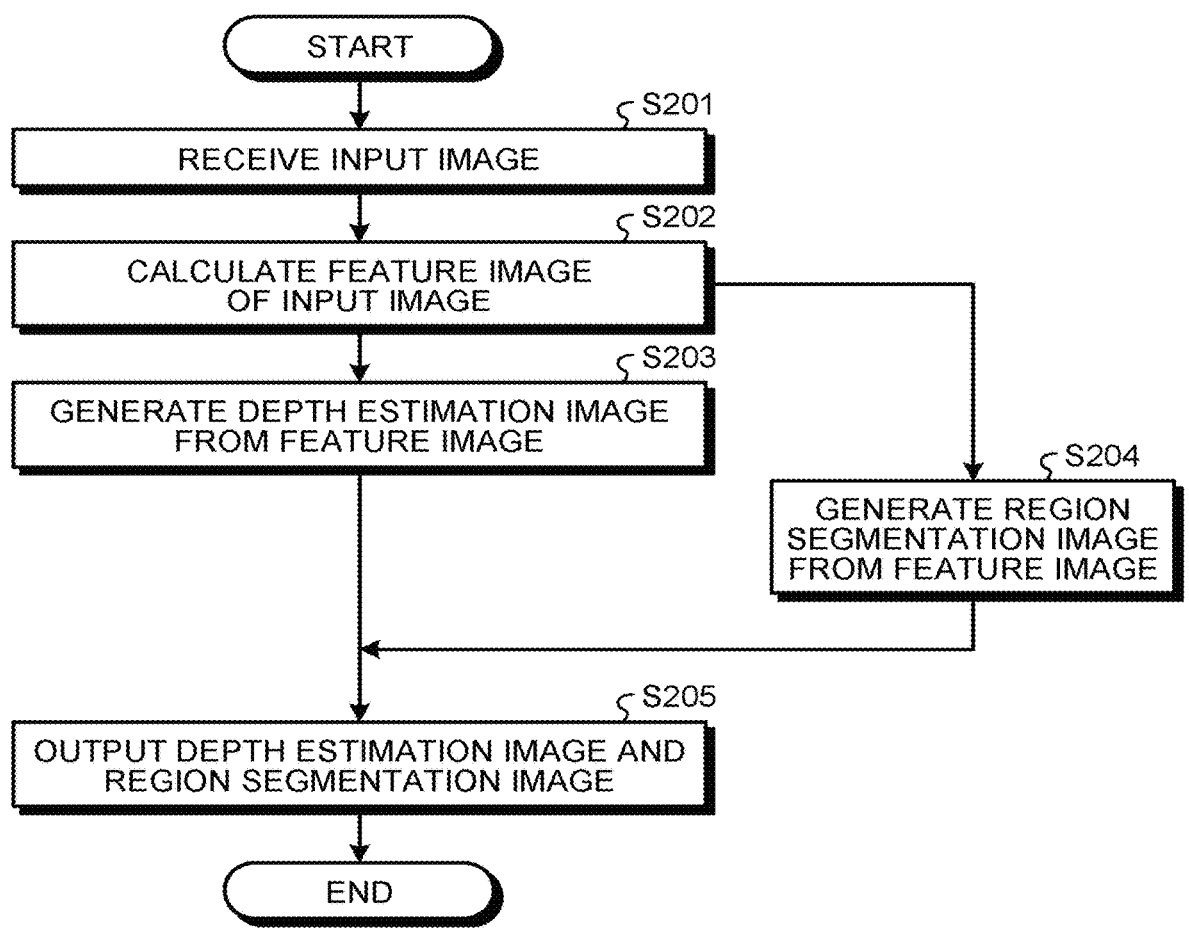
FIG. 5 is a flowchart of inference processing in the first embodiment.

The learned model of the depth estimation unit 103a and the learned model of the region segmentation unit 103b can be used for subsequent inference processing. FIG. 5 is a flowchart illustrating an example of inference processing in the first embodiment.

Step S201 to Step S204 are the same as Step S101 to Step S104 of FIG. 4 illustrating the learning processing. The depth estimation unit 103a and the region segmentation unit 103b output the depth estimation image and the region segmentation image acquired by estimation, respectively (Step S205), and the inference processing ends.

Figure 6:
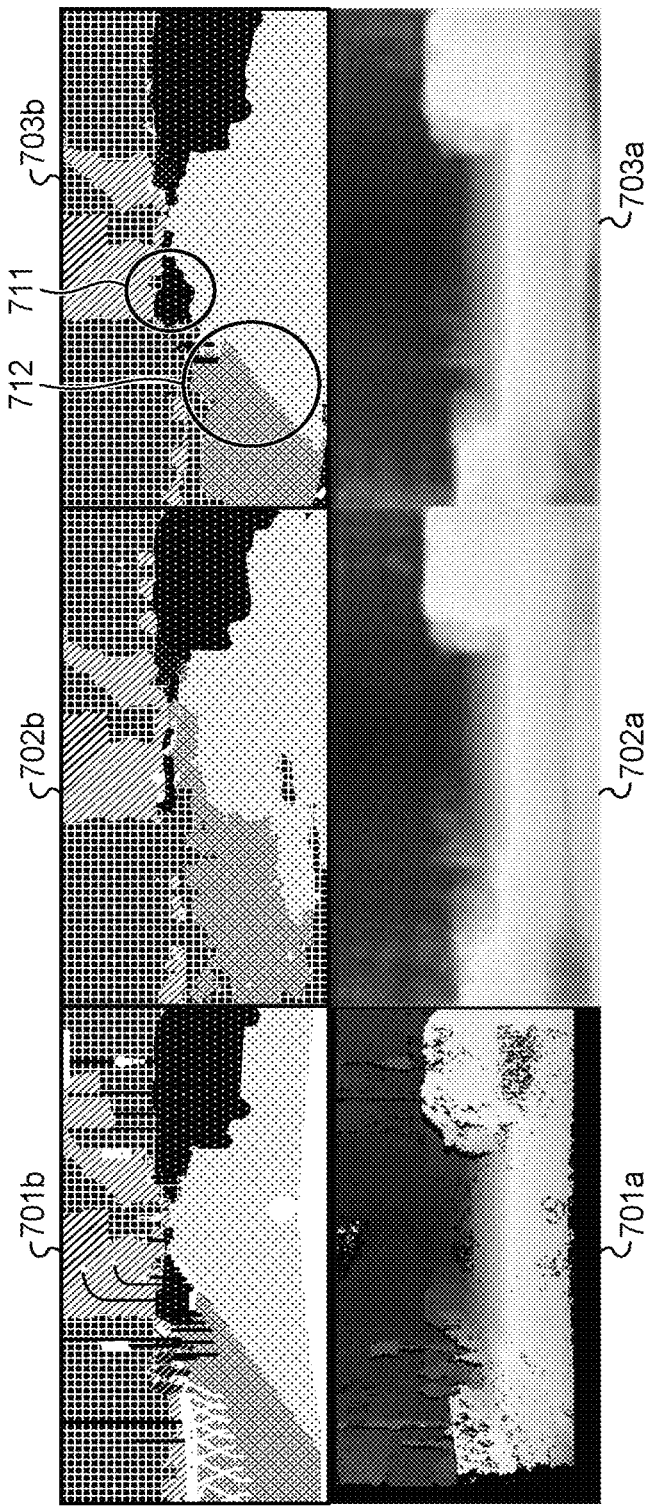
FIG. 6 is a diagram illustrating an example of output data acquired by the inference processing.

FIG. 6 is a diagram illustrating an example of output data acquired by the inference processing according to the present embodiment. In the example of FIG. 6, the input image to be used is an input image acquired by imaging the space ahead of the vehicle, including the road, sidewalks, and the like, with an imaging device (camera) mounted on the vehicle. While an image generated by CG may be used for learning, the input image used for inference processing is an image imaged in the real world.

A region segmentation image 701b is region segmentation supervised data (true value image) corresponding to the input image. A region segmentation image 702b indicates an estimation result of region segmentation in the case where the present embodiment is not applied, that is, in the case of executing inference using a model learned without using pseudo supervised data generated with the conversion processing unit 110 and the generation unit 104. A region segmentation image 703b indicates an estimation result in the case where the present embodiment is applied, that is, in the case of executing inference using a model learned using pseudo supervised data.

A depth estimation image 701a is depth estimation supervised data (true value image) corresponding to the input image. A depth estimation image 702a indicates an estimation result of depth estimation in the case where the present embodiment is not applied, that is, in the case of executing inference using a model learned without using pseudo supervised data generated with the conversion processing unit 110 and the generation unit 104. A depth estimation image 703a indicates an estimation result in the case where the present embodiment is applied, that is, in the case of executing inference using a model learned using pseudo supervised data.

As illustrated in the region segmentation image 702b, in the case where the present embodiment is not applied, the image includes many parts in which a sidewalk region and a road region are mixed. One of the factors thereof is an influence of a difference between the domain in learning and the domain in estimation processing.

By contrast, as illustrated in a region 712 in the region segmentation image 703b or the like, when the present embodiment is applied, confusion between the sidewalk region and the road region is remedied. In addition, as illustrated in a region 711, the accuracy of estimation of the region (vehicle region) in which another vehicle exists is improved. As described above, it is verified that applying the present embodiment enables region segmentation closer to supervised data. It is also verified that learning of a multitask network is normally executed without breakdown of depth estimation along with improvement of region segmentation.

As described above, the information processing device according to the first embodiment enables learning of a task (such as region segmentation) even with an image of a domain including no supervised data of the task.

Second Embodiment

The second embodiment illustrates an example of an information processing device serving as a multitask execution device executing three tasks. The three tasks are depth estimation, region segmentation (semantic segmentation), and normal line estimation. Normal line estimation is a task of estimating a normal line estimation image from an input image. The normal line estimation image is an image including a normal line direction of an object surface in each of the pixels in the image as a pixel value of each of the pixels.

In the first embodiment, pseudo data is generated for a pair of two tasks including depth estimation and region segmentation. In the present embodiment, pseudo data is generated also for a pair of two tasks including depth estimation and normal line estimation.

A pair of two tasks is not limited thereto, but may be, for example, a pair of two tasks including region segmentation and normal line estimation. Also in the case of a multitask execution device executing four or more tasks, pseudo data may be generated for a pair of any two of the tasks in the same manner and used for learning. Specifically, the two tasks (models) to generate pseudo data may be two tasks included in any of two or more pairs each including two tasks selected from three or more tasks as described above.

Figure 7:
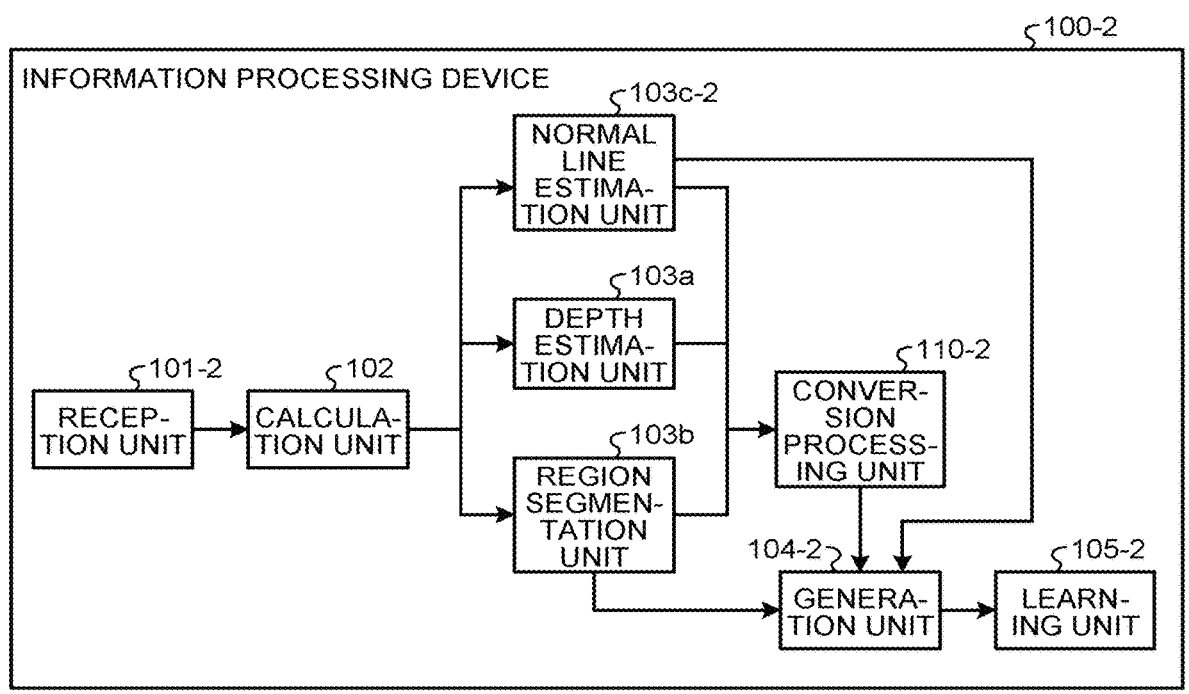
FIG. 7 is a block diagram of an information processing device according to a second embodiment.

FIG. 7 is a block diagram illustrating an example of a configuration of an information processing device 100-2 according to the second embodiment. As illustrated in FIG. 7, the information processing device 100-2 includes a reception unit 101-2, the calculation unit 102, the depth estimation unit 103a, the region segmentation unit 103b, a normal line estimation unit 103c-2, a conversion processing unit 110-2, a generation unit 104-2, and a learning unit 105-2.

The second embodiment is different from the first embodiment in that the normal line estimation unit 103c-2 is added and in functions of the reception unit 101-2, the conversion processing unit 110-2, the generation unit 104-2, and the learning unit 105-2. Because the other configurations and the functions are the same as those in FIG. 1 serving as the block diagram of the information processing device 100 according to the first embodiment, they are denoted by the same reference numerals, and an explanation thereof herein is omitted.

The reception unit 101-2 further receives input data including an input image 111c belonging to a domain C, different from the input image 111a. The input image 111c may be an image of the same domain as that of the input image 111b, or the same image as the input image 111b. The input image 111c includes corresponding supervised data (true value image) of normal line estimation.

The normal line estimation unit 103c-2 inputs data (such as a feature image and the input image) based on the input image to a model of normal line estimation, and acquires output data indicating execution results of normal line estimation based on the model. The model of normal line estimation may be any model, such as a convolutional neural network including a plurality of receptive fields of different sizes.

The convolutional neural network used in the normal line estimation unit 103c-2 is learned by minimizing a loss function indicating a difference between the normal line estimation image and supervised data of normal line estimation by a gradient method. The loss function is defined as in the following Expression (3) using, for example, the inner product of a normalized vector n of the estimated normal line and a normalized true value vector $n^{gt}$. Expression (3) is minimized when n and $n^{gt}$ are the same. For this reason, by minimizing Expression (3), the normal line estimation unit 103c-2 is learned to estimate a correct normal line.

$$L^{norm} = -n \cdot n^{gt} \quad (3)$$

Figure 8:
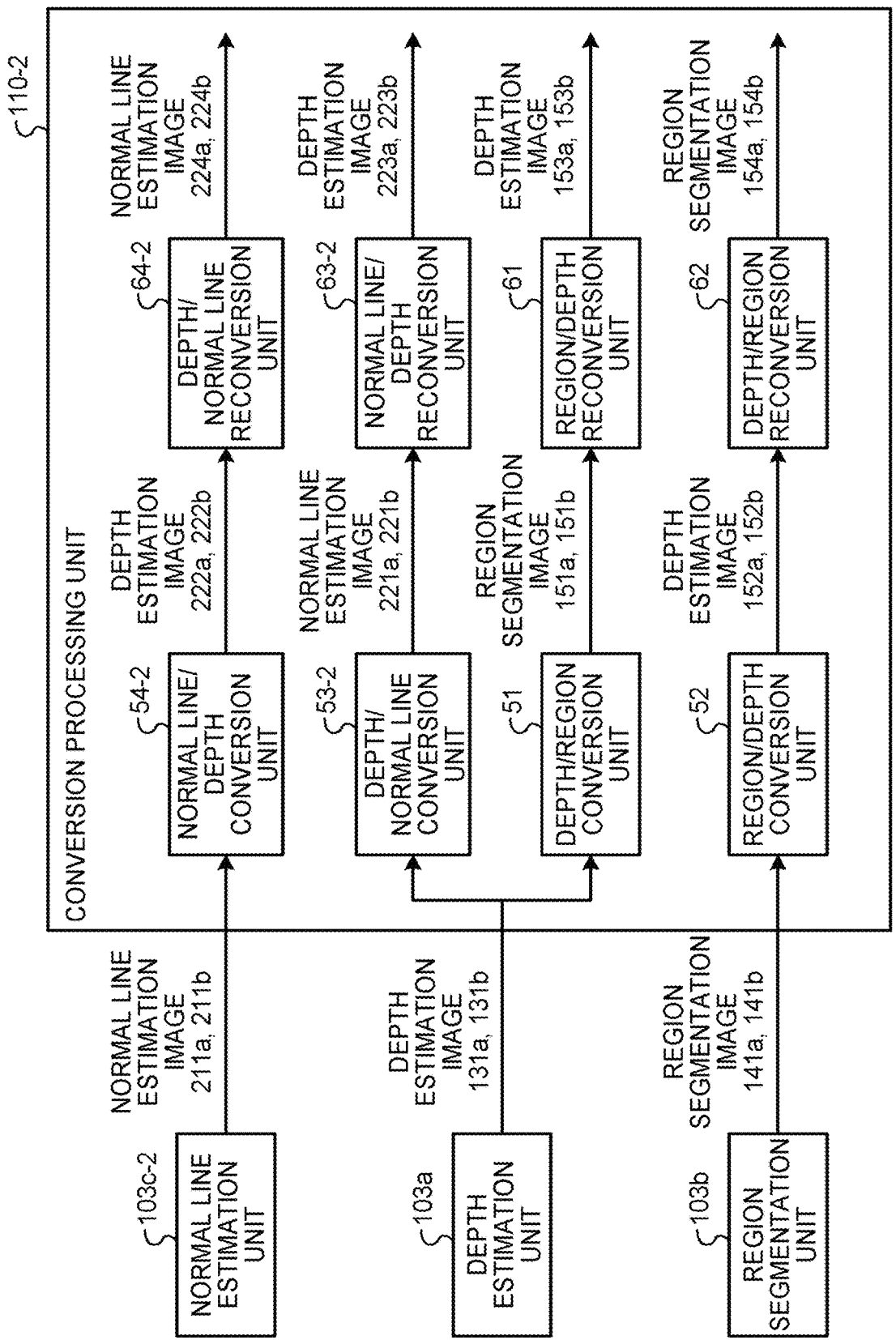
FIG. 8 is a functional block diagram of a conversion processing unit.

The conversion processing unit 110-2 is different from the conversion processing unit 110 according to the first embodiment in that the conversion processing unit 110-2 further includes a function of executing conversion between a depth estimation image and a normal line estimation image. The conversion processing between the depth estimation image and the normal line estimation image with the conversion processing unit 110-2 is similar to the operation acquired by replacing the region segmentation by normal line estimation in the conversion processing with the conversion processing unit 110 according to the first embodiment. FIG. 8 is a block diagram illustrating details of functions of the conversion processing unit 110-2.

As illustrated in FIG. 8, the conversion processing unit 110-2 includes the depth/region conversion unit 51, the region/depth conversion unit 52, the region/depth reconversion unit 61, the depth/region reconversion unit 62, a depth/normal line conversion unit 53-2, a normal line/depth conversion unit 54-2, a normal line/depth reconversion unit 63-2, and a depth/normal line reconversion unit 64-2.

The second embodiment is different from the first embodiment in that the depth/normal line conversion unit 53-2, the normal line/depth conversion unit 54-2, the normal line/depth reconversion unit 63-2, and the depth/normal line reconversion unit 64-2 are added. Because the other configurations and functions are the same as those in FIG. 2 serving as the block diagram of the conversion processing unit 110 according to the first embodiment, they are denoted by the same reference numerals, and an explanation thereof herein is omitted.

The depth/normal line conversion unit 53-2 converts the depth estimation images 131a and 131b into normal line estimation images 221a and 221b, respectively.

The normal line/depth conversion unit 54-2 converts normal line estimation images 211 (211a, 211b) into depth estimation images 222 (222a, 222b).

The normal line/depth reconversion unit 63-2 executes reconversion to restore normal line estimation images 221 (221a, 221b) to depth estimation images 223 (223a, 223b).

The depth/normal line reconversion unit 64-2 executes reconversion to restore the depth estimation images 222 (222a, 222b) to normal line estimation images 224 (224a, 224b).

Each of the depth/normal line conversion unit 53-2, the normal line/depth conversion unit 54-2, the depth/normal line reconversion unit 64-2, and the normal line/depth reconversion unit 63-2 is formed of, for example, a convolutional neural network to have functions equivalent to those of a neural network acquired by combining the calculation unit 102 and the depth estimation unit 103a or the normal line estimation unit 103c-2.

The model used with the depth/normal line conversion unit 53-2 and the model used with the depth/normal line reconversion unit 64-2 have the same neural network configuration, and share parameters of the convolutional neural network. The model of the depth/normal line conversion unit 53-2 and the depth/normal line reconversion unit 64-2 may be integrated into a convolutional neural network.

The model used with the normal line/depth conversion unit 54-2 and the model used with the normal line/depth reconversion unit 63-2 have the same neural network configuration, and share parameters of the convolutional neural network. The model used with the normal line/depth conversion unit 54-2 and the normal line/depth reconversion unit 63-2 may be integrated into a convolutional neural network.

In the conversion processing unit 110-2, first, the depth/normal line conversion unit 53-2 converts the depth estimation images 131 into the normal line estimation images 221. In addition, the normal line/depth conversion unit 54-2 converts the normal line estimation images 211 into depth estimation images 222.

The normal line estimation images 221 are reconverted into depth estimation images 223 with the normal line/depth reconversion unit 63-2. In addition, the depth estimation images 222 are reconverted into the normal line estimation images 224 with the depth/normal line reconversion unit 64-2.

The purpose of repeating conversion and reconversion is the same as the purpose described for the conversion processing unit 110 in the first embodiment, and is to prevent output from concentrating to the domain having supervised data of each of the tasks, among the domains to which the input images belong.

The neural network used with the depth/normal line conversion unit 53-2 is learned by minimizing the loss function indicating a difference between the normal line estimation image 221 and the supervised data of normal line estimation when the input image 111*c* is input. For example, Expression (3) can be used for the loss function.

The neural network used with the normal line/depth conversion unit 54-2 is learned by minimizing the loss function indicating a difference between the depth estimation image 222 and the supervised data 112*a* when the input image 111*a* is input. A loss function, such as BerHu loss expressed in Expression (1), can be used as the loss function.

The neural network used with the depth/normal line reconversion unit 64-2 is learned by minimizing the loss function indicating a difference between the normal line estimation image 224 and the normal line estimation image 211, when the input image 111*a* is input. In addition, when the input image 111*c* is input, the neural network is learned by minimizing the loss function indicating a difference between the normal line estimation image 224 and the supervised data of normal line estimation. In each of the cases, for example, Expression (3) can be used for the loss function.

Learning of the normal line/depth reconversion unit 63-2 is executed by minimizing the loss function indicating a difference between the depth estimation image 222 and the supervised data 112*a*, when the input image 111*a* is input. In addition, when the input image 111*c* is input, learning is executed by minimizing the loss function indicating a difference between the depth estimation image 222 and the depth estimation image 131. In each of the cases, for example, Expression (1) can be used for the loss function.

The conversion processing unit 110-2 outputs the normal line estimation image 221 to the generation unit 104-2.

With reference to FIG. 7 again, the generation unit 104-2 further has a function of generating pseudo supervised data of normal line estimation corresponding to the input image 111*a* on the basis of the normal line estimation image 221 output from the conversion processing unit 110-2 and the normal line estimation image 211 output from the normal line estimation unit 103*c*-2.

The generation unit 104-2 determines the pixels (pseudo supervised pixels) to be included in the pseudo supervised data on the basis of one or more rules to secure the degree of reliability, to avoid damage to reliability of the pseudo supervised data. For example, the following rules are further applied.

R3: One or more pixels having larger cosine similarity of the normal line vector of the same pixel in the normal line estimation image 211 and the normal line estimation image 221 than that of other pixels are set as pseudo supervised pixels. Whether the cosine similarity is larger than that of the other pixels is determined on the basis of, for example, whether the cosine similarity is larger than a threshold.

The generation unit 104-2 sets, as pseudo supervised data, a region of pseudo supervised pixels calculated in accordance with the rules as described above, in the normal line estimation image 221, and deals with the pixels other than the pseudo supervised pixels as a region not used for calculation of the loss function.

The models used with the calculation unit 102 and the normal line estimation unit 103*c*-2 can be learned not only for the input image 111*c* but also for the domain to which the input image 111*a* belongs, by minimizing the error function indicating a difference between the normal line estimation image 211 and the generated pseudo supervised data. Expression (3) or the like can be used for the loss function.

The learning unit 105-2 is different from the learning unit 105 according to the first embodiment in that the learning unit 105-2 further has a function of learning a model added in relation to normal lint estimation. The loss function described above can be used for learning of the added model.

Figure 9:
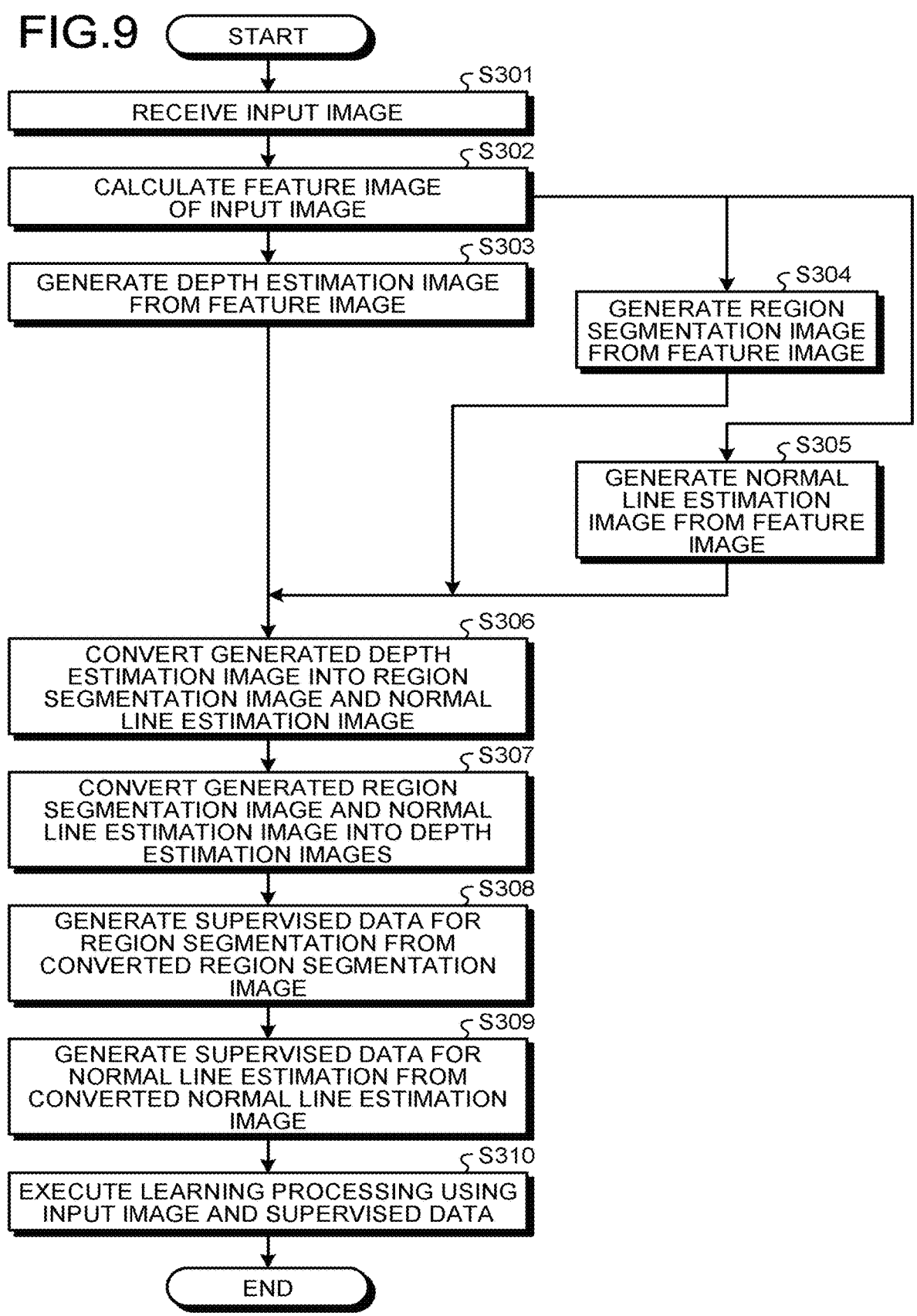
FIG. 9 is a flowchart of learning processing in the second embodiment.

The following is an explanation of learning processing executed with the information processing device 100-2 structured as described above according to the second embodiment with reference to FIG. 9. FIG. 9 is a flowchart of an example of learning processing in the second embodiment.

Step S301 to Step S304 are the same processing as that of Step S101 to Step S104 in the information processing device 100 according to the first embodiment, and an explanation thereof herein is omitted.

In the present embodiment, the normal line estimation unit 103*c*-2 inputs the calculated feature image to the corresponding neural network, and estimates a normal line estimation image (Step S305).

The depth/region conversion unit 51 in the conversion processing unit 110-2 converts the depth estimation image into a region segmentation image, and the depth/normal line conversion unit 53-2 converts the depth estimation image into a normal line estimation image (Step S306). In addition, the region/depth conversion unit 52 in the conversion processing unit 110-2 converts the region segmentation image into a depth estimation image, and the normal line/depth conversion unit 54-2 converts the normal line estimation image into a depth estimation image (Step S307).

For learning of each of the units in the conversion processing unit 110-2, the region/depth reconversion unit 61 reconverts the region segmentation image into a depth estimation image, the depth/region reconversion unit 62 reconverts the depth estimation image into a region segmentation image, the normal line/depth reconversion unit 63-2 reconverts the normal line estimation image into a depth estimation image, and the depth/normal line reconversion unit 64-2 reconverts the depth estimation image into a normal line estimation image.

The generation unit 104-2 generates pseudo supervised data for the model of region segmentation from the converted region segmentation image (Step S308). The generation unit 104-2 also generates pseudo supervised data for the model of normal line estimation from the converted normal line estimation image (Step S309).

The learning unit 105-2 executes learning using the input image, the supervised data for the input image, and the generated pseudo supervised data (Step S310).

Figure 10:
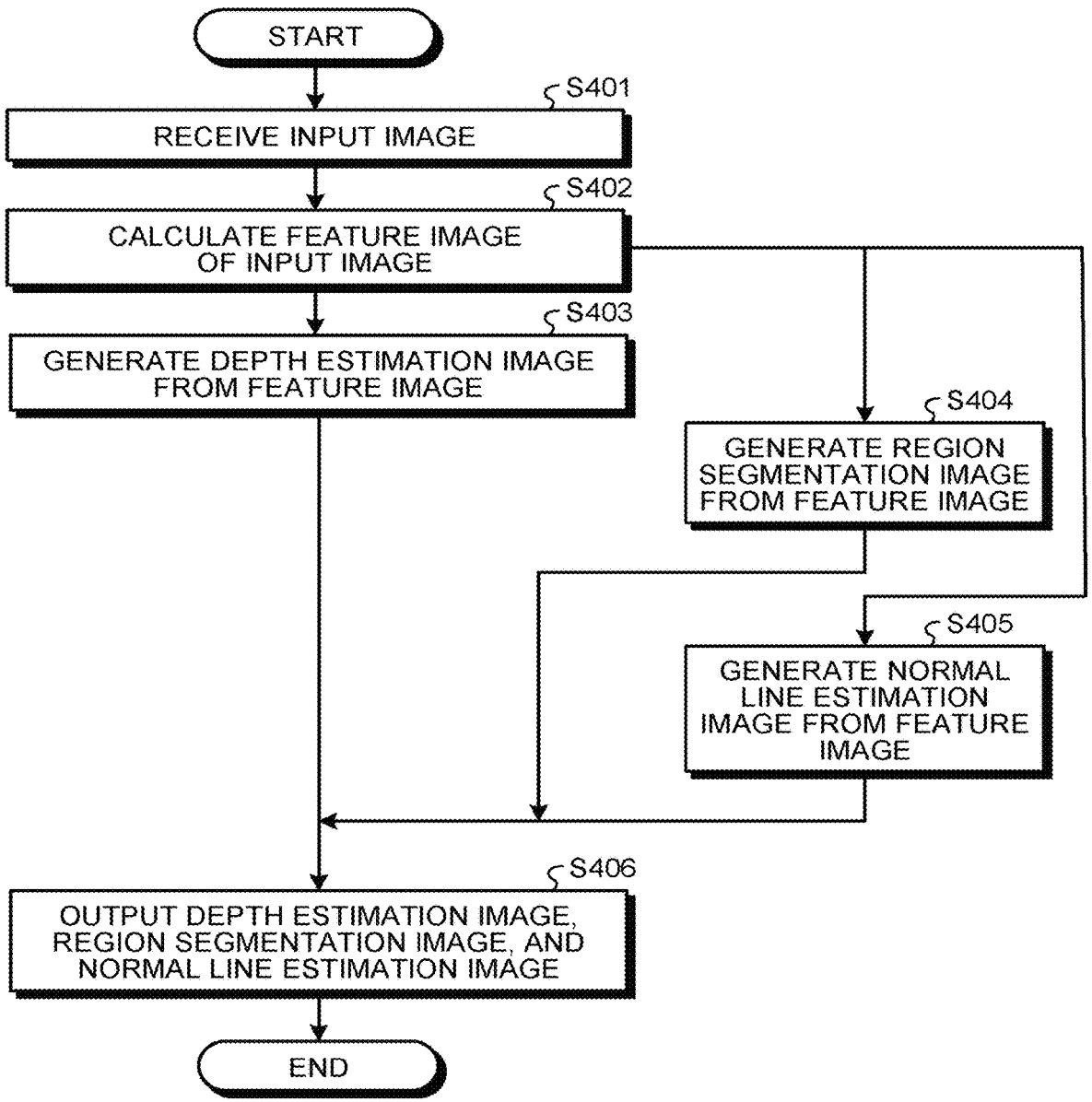
FIG. 10 is a flowchart of inference processing in the second embodiment.

FIG. 10 is a flowchart illustrating an example of inference processing in the second embodiment.

Step S401 to Step S405 are the same as Step S301 to Step S305 in FIG. 9 illustrating learning processing. The depth estimation unit 103a, the region segmentation unit 103b, and the normal line estimation unit 103c-2 output a depth estimation image, a region segmentation image, and a normal line estimation image acquired by estimation, respectively (Step S406), and the inference processing ends.

As described above, the second embodiment enables learning of normal line estimation even with an image of a domain including no supervised data of normal line estimation. Specifically, this structure enables learning in three tasks, together with depth estimation in which supervised data exists and region segmentation in the same manner as in the first embodiment.

As explained above, the first and the second embodiments enable highly accurate estimation for data of the target domain, even when a task lacking supervised data exists, by preparing pseudo supervised data on the basis of conversion in the output space.

Figure 11:
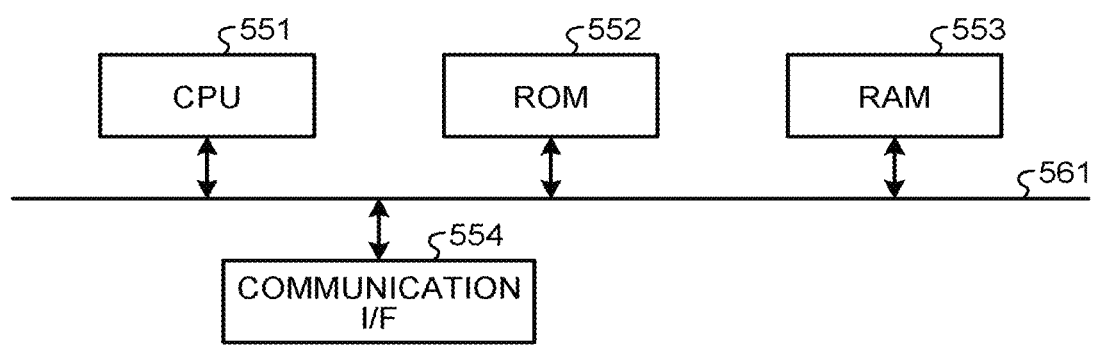
FIG. 11 is a hardware configuration diagram of the information processing device according to the first or the second embodiment.

The following is an explanation of a hardware configuration of the information processing device according to the first or the second embodiment with reference to FIG. 11. FIG. 11 is an explanatory drawing illustrating a hardware configuration example of the information processing device according to the first or the second embodiment.

The information processing device according to the first or the second embodiment includes a control device, such as a CPU 551, storage devices, such as a read-only memory (ROM) 552 and a random-access memory (RAM) 553, a communication interface (I/F) 554 connected to a network to perform communication, and a bus 561 connecting the units.

The information processing device may be physically formed of one device or a plurality of devices. For example, the information processing device may be constructed on a cloud environment.

The computer program executed with the information processing device according to the first or the second embodiment is provided by being installed in the ROM 552 or the like in advance.

The computer program executed with the information processing device according to the first or the second embodiment may be configured to be recorded in a file of an installable form or an executable form on a computer-readable recording medium, such as a compact disc read-only memory (CD-ROM), a flexible disk (FD), a compact disc recordable (CD-R), and a digital versatile disc (DVD), and provided as a computer program product.

As another example, the computer program executed with the information processing device according to the first or the second embodiment may be configured to be stored on a computer connected to a network, such as the Internet, and provided by being downloaded via the network. As another example, the computer program executed with the information processing device according to the first or the second embodiment may be configured to be provided or distributed via a network, such as the Internet.

The computer program executed with the information processing device according to the first or the second embodiment is capable of causing a computer to function as each of the units of the information processing device described above. The computer is capable of reading a computer program from a computer-readable storage medium onto a main storage device with the CPU 551 and executing the computer program.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing device comprising:
one or more processors configured to:
receive input data including first input data belonging to a first domain and second input data belonging to a second domain different from the first domain;
input data based on the input data to a first model, and acquire first output data indicating an execution result of a first task with the first model;
input data based on the input data to a second model, and acquire second output data indicating an execution result of a second task with the second model;
convert the first output data into first conversion data expressed in a form of an execution result of the second task, the execution result of the second task including a plurality of elements;
generate supervised data of the second model for the first input data, based on the first conversion data and the second output data, and
learn the second model using the first input data and the supervised data, wherein
the first task is one of a plurality of tasks including depth estimation, semantic segmentation, instance segmentation, panoptic segmentation, object detection, autoencoder, super resolution, edge detection, generation of a saliency map, and normal line estimation;
the second task is another one of the plurality of tasks;
the first model outputs the execution result of the first task;
the second model outputs the execution result of the second task; and
the supervised data includes
one or more elements having a degree of reliability larger than those of another element in both the first conversion data and the second output data, or
one or more elements being classified into a same class in both the first conversion data and the second output data.

2. The device according to claim 1, wherein the one or more processors calculate feature data indicating a feature of the input data,
input the feature data to the first model, and acquire the first output data.

3. The device according to claim 1, wherein the one or more processors
calculate feature data indicating a feature of the input data,
input the feature data to the second model, and acquires the second output data.

4. The device according to claim 1, wherein the one or more processors
learn a first conversion model using a loss function determined in accordance with a difference between the supervised data of the second model and the first conversion data, the first conversion model being used for conversion of the first conversion data.

5. The device according to claim 4, wherein the one or more processors
convert the first conversion data into first reconversion data expressed in a form of an execution result of the first task,
learn a first reconversion model using a loss function determined in accordance with a difference between at least one of supervised data of the first model and the first output data and the first reconversion data, the first reconversion model being a model used for conversion of the first reconversion data and having a parameter shared with the first conversion model.

6. The device according to claim 4, wherein the one or more processors
convert the second output data into second conversion data expressed in a form of an execution result of the first task,
learn a second conversion model using a loss function determined in accordance with a difference between supervised data of the first model and the second conversion data, the second conversion model being used for conversion of the second conversion data.

7. The device according to claim 6, wherein the one or more processors
convert the second conversion data into second reconversion data expressed in the form of the execution result of the second task,
learn a second reconversion model using a loss function determined in accordance with a difference between at least one of the supervised data of the second model and the second output data and the second reconversion data, the second reconversion model being a model used for conversion of the second reconversion data and having a parameter shared with the second conversion model.

8. The device according to claim 1, wherein the first input data includes supervised data of the first model, and includes no supervised data of the second model.

9. The device according to claim 1, wherein
the degree of reliability is a classification probability of each class.

10. The device according to claim 1, wherein the one or more processors
learn the first model using a loss function determined in accordance with a difference between the first output data output for the first input data and supervised data of the first task, and
learn the second model using a loss function determined in accordance with a difference between the second output data output for the second input data and supervised data of the second task and a loss function determined in accordance with a difference between the second output data output for the first input data and the supervised data.

11. The device according to claim 1, wherein at least one of the first model and the second model is a neural network.

12. The device according to claim 1, wherein the first task and the second task are two tasks included in any of two or more pairs each including two tasks selected from three or more tasks.

13. The device according to claim 1, wherein the one or more processors
learn a first conversion model using data belonging to the first domain and including supervised data of the first model and supervised data of the second model, the first conversion model being used for conversion of the first conversion data.

14. An information processing method comprising:
receiving input data including first input data belonging to a first domain and second input data belonging to a second domain different from the first domain;
inputting data based on the input data to a first model, and acquiring first output data indicating an execution result of a first task with the first model;
inputting data based on the input data to a second model, and acquiring second output data indicating an execution result of a second task with the second model;
converting the first output data into first conversion data expressed in a form of an execution result of the second task, the execution result of the second task including a plurality of elements;
generating supervised data of the second model for the first input data, based on the first conversion data and the second output data, and
learning the second model using the first input data and the supervised data, wherein
the first task is one of a plurality of tasks including depth estimation, semantic segmentation, instance segmentation, panoptic segmentation, object detection, autoencoder, super resolution, edge detection, generation of a saliency map, and normal line estimation;
the second task is another one of the plurality of tasks;
the first model outputs the execution result of the first task;
the second model outputs the execution result of the second task; and
the supervised data includes
one or more elements having a degree of reliability larger than those of another element in both the first conversion data and the second output data, or
one or more elements being classified into a same class in both the first conversion data and the second output data.

15. A computer program product having a non-transitory computer readable medium including programmed instructions, wherein the instructions, when executed by a computer, cause the computer to perform:
receiving input data including first input data belonging to a first domain and second input data belonging to a second domain different from the first domain;
inputting data based on the input data to a first model, and acquiring first output data indicating an execution result of a first task with the first model;
inputting data based on the input data to a second model, and acquiring second output data indicating an execution result of a second task with the second model;

converting the first output data into first conversion data expressed in a form of an execution result of the second task, the execution result of the second task including a plurality of elements;

generating supervised data of the second model for the first input data, based on the first conversion data and the second output data, and learning the second model using the first input data and the supervised data, wherein the first task is one of a plurality of tasks including depth estimation, semantic segmentation, instance segmentation, panoptic segmentation, object detection, autoencoder, super resolution, edge detection, generation of a saliency map, and normal line estimation;

the second task is another one of the plurality of tasks;

the first model outputs the execution result of the first task;

the second model outputs the execution result of the second task; and the supervised data includes
- one or more elements having a degree of reliability larger than those of another element in both the first conversion data and the second output data, or
- one or more elements being classified into a same class in both the first conversion data and the second output data.

* * * * *